(12) United States Patent
Chao et al.

(10) Patent No.: US 6,727,439 B2
(45) Date of Patent: Apr. 27, 2004

(54) PRESSURE SENSITIVE PEN

(75) Inventors: Ching-Chuan Chao, Sanchung (TW); Bor-Sen Chang, Junghe (TW); Chung-Wen Hsu, Kaohsiung (TW)

(73) Assignee: Aiptek International Inc., Hsin-Chu (TW)

( * ) Notice: Subject to any disclaimer, the term of this patent is extended or adjusted under 35 U.S.C. 154(b) by 208 days.

(21) Appl. No.: 10/055,925

(22) Filed: Jan. 28, 2002

(65) Prior Publication Data

US 2003/0141119 A1 Jul. 31, 2003

(51) Int. Cl.$^7$ .............................................. G09G 5/00
(52) U.S. Cl. .................................. 178/19.01; 345/179
(58) Field of Search ......................... 178/19.01, 19.02, 178/19.03, 19.04, 19.05, 18.01, 18.02, 18.03, 18.04, 18.05, 18.06, 18.07; 345/164, 165, 173, 174, 179, 184, 156

(56) References Cited

U.S. PATENT DOCUMENTS

| | | | |
|---|---|---|---|
| 5,564,850 A | * 10/1996 | Nagaoka ...................... 401/37 |
| 5,565,632 A | * 10/1996 | Ogawa ..................... 73/862.69 |
| 5,576,502 A | * 11/1996 | Fukushima et al. ...... 73/862.68 |
| 5,581,052 A | * 12/1996 | Padula et al. ............. 178/19.04 |
| 5,633,471 A | * 5/1997 | Fukushima ................. 73/865.4 |
| 5,914,708 A | * 6/1999 | LaGrange et al. ........... 345/179 |
| 6,252,182 B1 | * 6/2001 | Lai ........................... 178/19.04 |
| 6,556,190 B2 | * 4/2003 | Fleck et al. ................. 345/179 |

* cited by examiner

Primary Examiner—Vijay Shankar
Assistant Examiner—Nitin Patel
(74) Attorney, Agent, or Firm—Dickinson Wright PLLC

(57) ABSTRACT

A pressure sensitive pen is provided. The pressure sensitive pen comprises a core body, an elastic element, a first magnetic body having one coil formed of at least a wire wound around, a second magnetic body, a sliding member, a hollow cylindrical body with an annular element formed therein and an inductance-capacitance type resonant circuit. The resonant circuit is electrically connected with the first magnetic body having the coil wound around. When a force is upward applied on the core body, the force is further applied on the sliding member through the core body such that the sliding member in conjunction with the second magnetic body move upward and make the elastic element deformed, and changing a predetermined distance between the first magnetic body and the second magnetic body, thereby changing an inductance generated by the coil, and the resonance frequency of the resonant circuit is thus changed.

10 Claims, 5 Drawing Sheets

PRESSURE SENSITIVE PEN

BACKGROUND OF THE INVENTION

1. Field of the Invention

The present invention relates to a positional indicator used in a digitizer tablet, and more particularly to a pen-like device that can detect pen press pressure or that comprises pen pressure sensitive mechanisms.

2. Description of the Prior Art

Currently, widely used computer input devices include the keyboard and the mouse. Due to the advances of digital technologies, more and more computer users have begun working with digitizer-based devices such as digitizer tablets, which allow a user to write and draw upon the working area of the tablet and have the signals and codes interpreted by a computer. Specifically, the working area of the tablet provides a writing surface for capturing the position, pressure and key status of an object, such as a pen or a mouse, and information related to pressure and actuated keys etc. In cooperation with the tablet, a pen-like device is required to create such objects. Most existing pen-like devices, which can be corded or cordless, are not able to generate lines with variable width according to different depressed forces upon the working area of the tablet applied by the pen-like devices. To overcome this shortage, pressure sensitive pens were invented.

FIG. 1A shows a schematic cross-sectional view of a prior pressure sensitive pen 10, which comprises a casing 12 having a cylindrical outer body, a core body 14 provided on the axis of the casing 12, a ferrite core 16 having a through-hole for slidably housing the core body 14, coil 20 wound around the ferrite core 16, a movable magnetic body 18 that can move in relation to the core body 14, a spring 22, and a capacitor 24. The core body 14 has a generally cylindrical form, while its upper neighboring portion, which touches the positional detecting plane, has a tapered form such that the operation allows it to easily indicate a specified point.

The ferrite core 16 is fixed to the casing 12. The core body 14 moves backward along its axis by a depressing force when the pen top 13 is depressed against the positional detecting plane. The moveable magnetic body 18 is positioned to move in conjunction with the core body 14. The relative distance to the ferrite core 16 is therefore varied as the magnetic body 18 moves. The coil 20 and the capacitor 24 form a resonant circuit. Conditions of this resonant circuit are determined such that the circuit resonates with the coil 20 while inducing and transmitting an electromagnetic field between them. The inductance of the coil 20 can be changed when the gap between the ferrite core 16 and the magnetic body 18 is changed. It thus detects the depressing force against the pen top 13 by sensing the change in the resonant conditions caused by the placement of the pen.

However, if the pressure sensitive pen 10 is operated in an inclined position against the detecting plane, the direction of the depressing force is then no more coincident with the axial direction of the core body 14. In such a case, only the axial component of the depressing force is transferred to the core body 14 so that the amount of the depressing force contributing to detection is decreased. Thus, the inductance change generated by the displacement of the magnetic body is reduced. The sensitivity of the pen pressure detection is also reduced if the pressure sensitive pen 10 is operated in an inclined position so that it cannot detect a weaker pen pressure.

Normally, it is natural for an operator to hold the pen in an inclined position, rather than in an orthogonal position while inputting with the pen in hand onto a horizontal plane.

To attain an increased absolute sensitivity by compensating for such a defect, it is desirable to provide a structure that provides the movable magnetic body 18 with a larger area, and has its end face opposed to the face of the fixed magnetic body 16, such as shown in FIG. 1B rather than to use the movable magnetic body 18 having a smaller area shown in FIG. 1A. In FIG. 1B, it is however required to assemble the pen with the initial gap predetermined as the interval between the two magnetic bodies when the pen not depressed by its tip. That requires high accuracy when placing the movable magnetic body. Moreover, ferrite material normally used for the fixed magnetic body is made by powder metallurgy, so that its dimensional tolerance is large and thus it is difficult to ensure the accuracy mentioned above.

Accordingly, it is an intention to provide an improved pressure sensitive pen to overcome the drawbacks mentioned-above.

SUMMARY OF THE INVENTION

It is one objective of the present invention to provide a pressure sensitive pen, which uses a fixed magnetic body having one coil formed of at least a wire wound around and a movable magnetic body. A predetermined distance between the fixed magnetic body and the movably magnetic body is changed when applying a depressing force on a core body of the pen. As a result, an inductance generated by the coil is changed and a frequency of electromagnetic field emitted from the pen is thereby changed.

It is another objective of the present invention to provide a pressure sensitive pen, which utilizes an annular member disposed in a hollow cylinder to separate a fixed magnetic body having one coil formed of at least a wire wound around and a movable magnetic body such that a predetermined distance between the fixed magnetic body and the movable magnetic body is accurately and properly controlled when there is no force applied on a core body of the pen. An initial frequency of electromagnetic field emitted from the pen is kept constant and not influenced by a common difference of the magnetic bodies in dimension.

It is a further objective of the present invention to provide a pressure sensitive pen, in which one coil is formed of at least a wire wound around a fixed magnetic body so that the coil obtains a high Q value. Hence, the capability of the coil for inducing/emitting electromagnetic field is very excellent. The pen can directly induce an electromagnetic field coming from an underlying tablet to serve as power source, and does not require an additional power supply such as a battery.

It is still a further objective of the present invention to provide a pressure sensitive pen, in which one coil is formed of at least a wire wound around a fixed magnetic body so that the coil obtains a high Q value. Hence, the capability of the coil for emitting electromagnetic field is very excellent. As a result, an underlying tablet for detecting pressure variation of the pen has a higher S/N ratio, and the resolution of the tablet is improved. The signal transformation of the tablet from a frequency value into a pressure value is facilitated.

In order to achieve the above objectives of this invention, the present invention provides a pressure sensitive pen having a pressure sensitive mechanism. The pressure sensitive mechanism comprises a supporting member, an elastic element, a hollow cylindrical body, a first magnetic body, a second magnetic body, a sliding member, a core body and one coil formed of at least a wire wound around the first magnetic body. One end of the supporting member is provided with a first housing. The elastic element is disposed in the first housing. One end of the hollow cylindrical body is leaned against the end of the supporting member having the first housing. The hollow cylindrical body has an inner surface and an outer surface. The inner surface of the hollow cylindrical body is formed with an annular member for dividing the hollow cylindrical body into a second housing and a third housing. The third housing is formed between the annular member and the first housing. The first magnetic body is provided with a first central through-hole. One end of the first magnetic body is engagely received in the second housing and against the annular member. The second magnetic body is provided with a second central through-hole. The second magnetic body is movably disposed in the third housing and one end thereof is leaned against the annular member. The sliding member is movably disposed in the third housing. The sliding member is formed with a cylindrical body and an annular element. The annular element is formed around an outer surface of the cylindrical body to divide the sliding member into a first part and a second part. The length of the first part is a little shorter than that of the second magnetic body. A fourth housing is formed within the first part of the sliding member. The first part of the sliding member engagely passes through the second central through-hole of the second magnetic body such that the sliding member moves upward and downward in conjugation with the second magnetic body. The sliding member has a second end against the elastic element. The core body passes through the first central through-hole of the first magnetic body and the annular member and one end thereof is engagely received in the fourth housing. The coil formed of at least a wire is wound around the first magnetic body. When a force is upward applied on the core body, the sliding member in conjugation with the second magnetic body move upward away from the annular member. When there is no force applied on the core body, the elastic element forces the sliding member in conjugation with the second magnetic body against the annular member.

BRIEF DESCRIPTION OF THE DRAWINGS

The objectives and features of the present invention as well as advantages thereof will become apparent from the following detailed description, considered in conjunction with the accompanying drawings. It is to be understood, however, that the drawings, which are not to scale, are designed for the purpose of illustration and not as a definition of the limits of the invention, for which reference should be made to the appended claims.

DESCRIPTION OF THE PREFERRED EMBODIMENTS

Figures 1A, 1B:
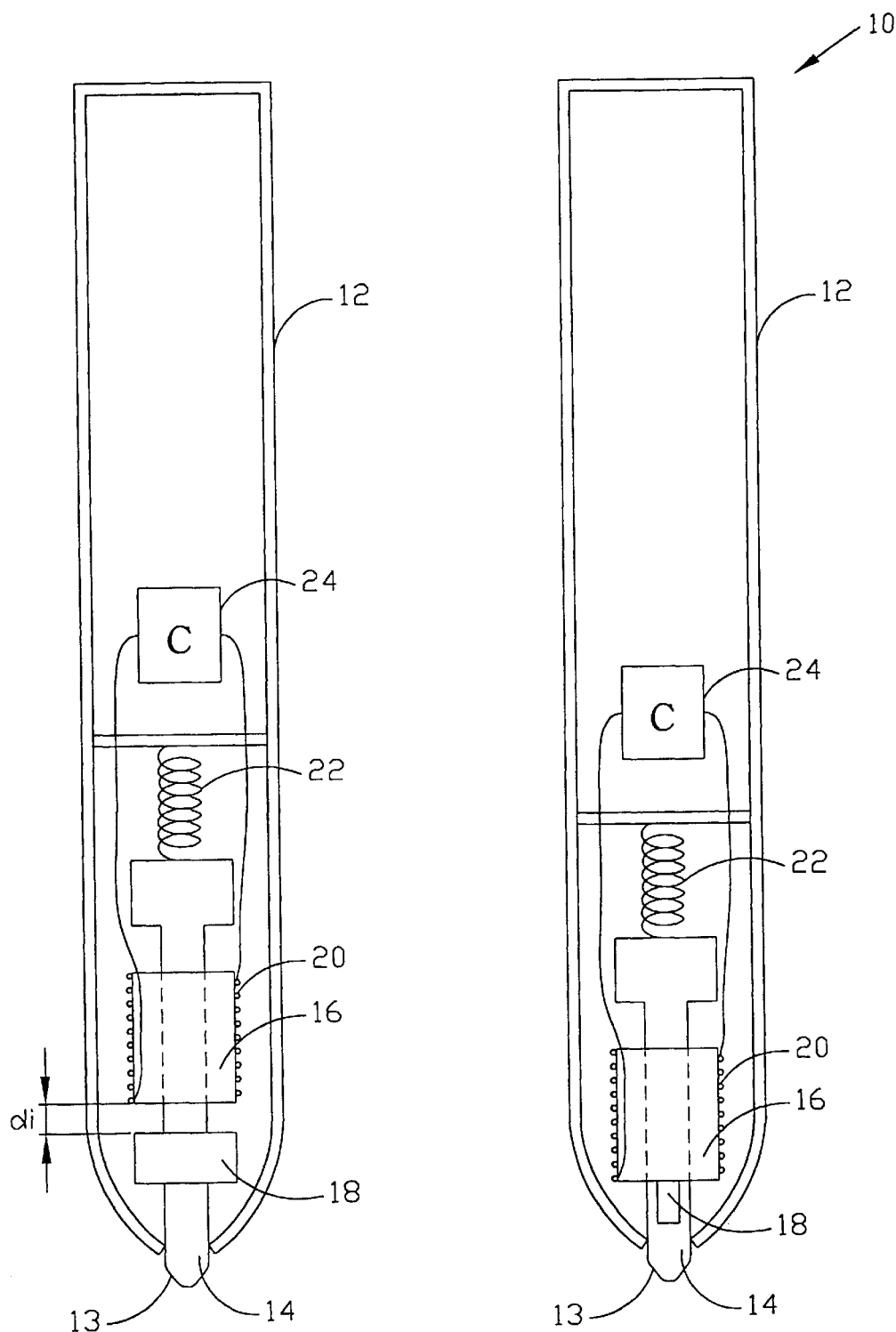
FIG. 1A shows a schematic cross-sectional view of a prior pressure sensitive pen.
FIG. 1B shows a schematic cross-sectional view of another prior pressure sensitive pen.
Figure 2A:
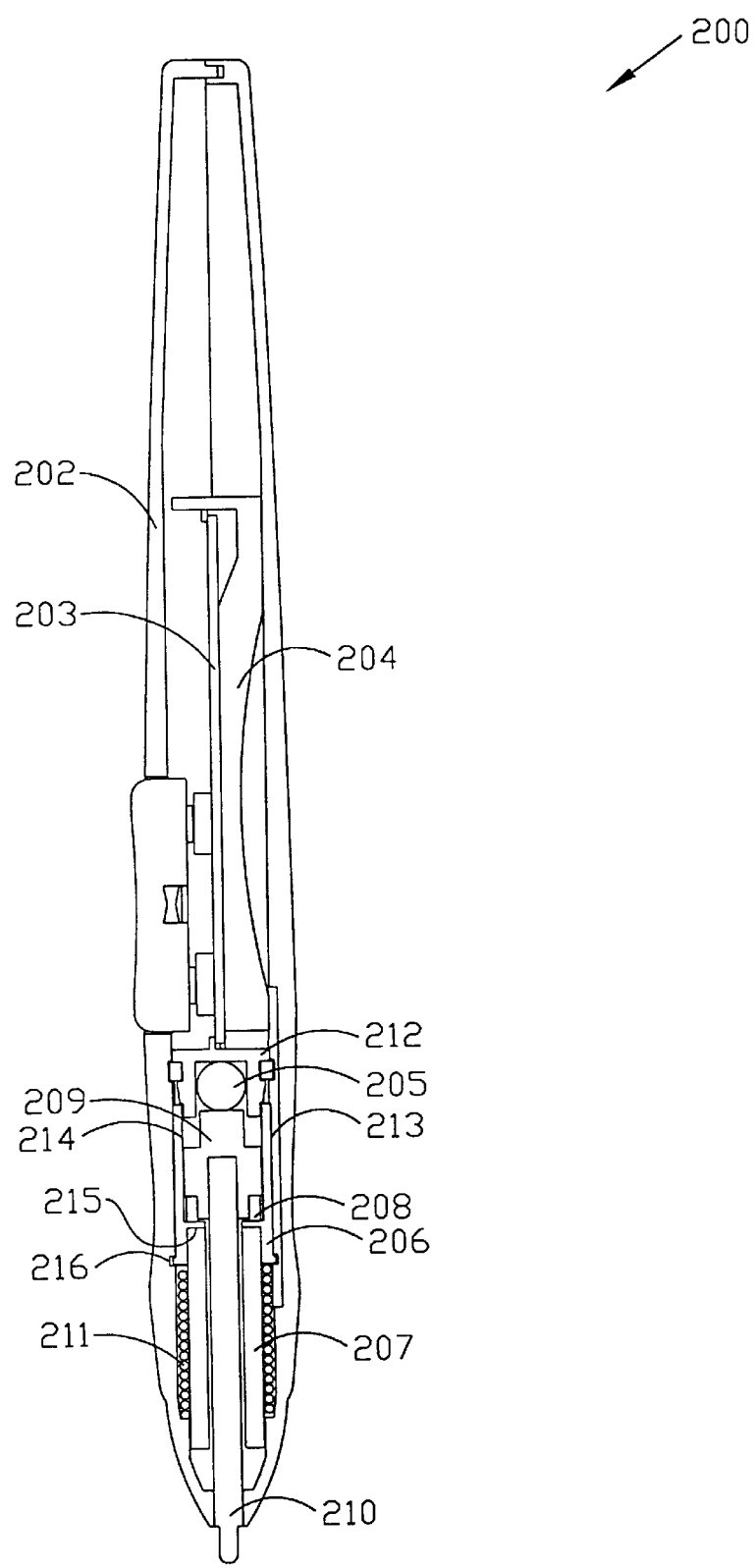
FIG. 2A shows a schematic cross-sectional view of a pressure sensitive pen according to one preferred embodiment of the present invention.
Figure 2B:
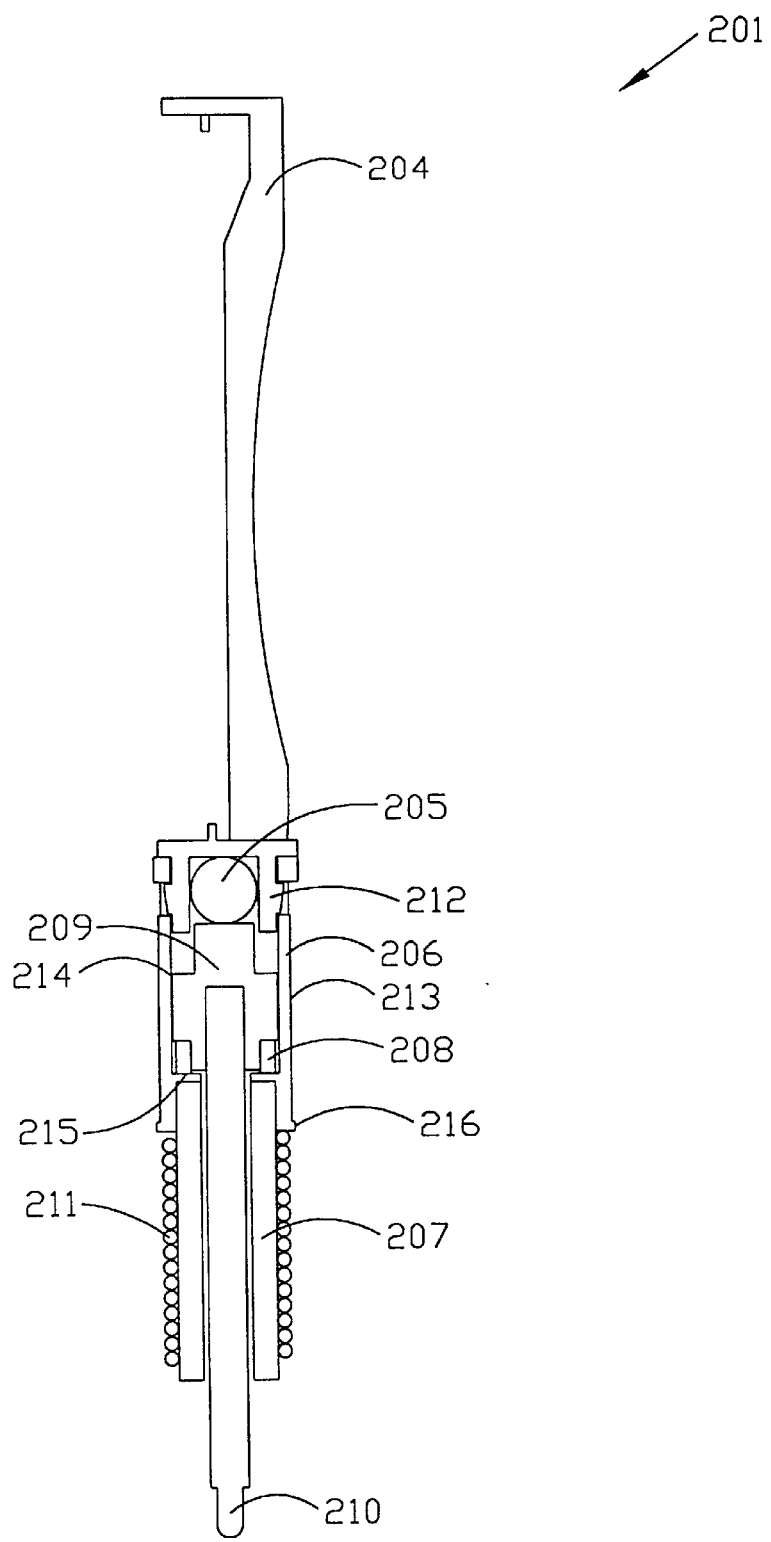
FIG. 2B shows a schematic cross-sectional view of a pressure sensitive mechanism of the pressure sensitive pen of FIG. 2A, wherein the pen is not in use state.

FIG. 2A is a schematic cross-sectional view of a pressure sensitive pen according to one preferred embodiment of the present invention. The pressure sensitive pen 200 comprises a pressure sensitive mechanism 201, an outer casing 202 and a print circuit board 203. Referring to FIG. 2B, the pressure sensitive mechanism 201 comprises a supporting member 204, an elastic element 205, a hollow cylindrical body 206, a first magnetic body 207, a second magnetic body 208, a sliding member 209, a core body 210 and one coil 211 formed of at least a wire wound around the first magnetic body 207.

Figure 2C:
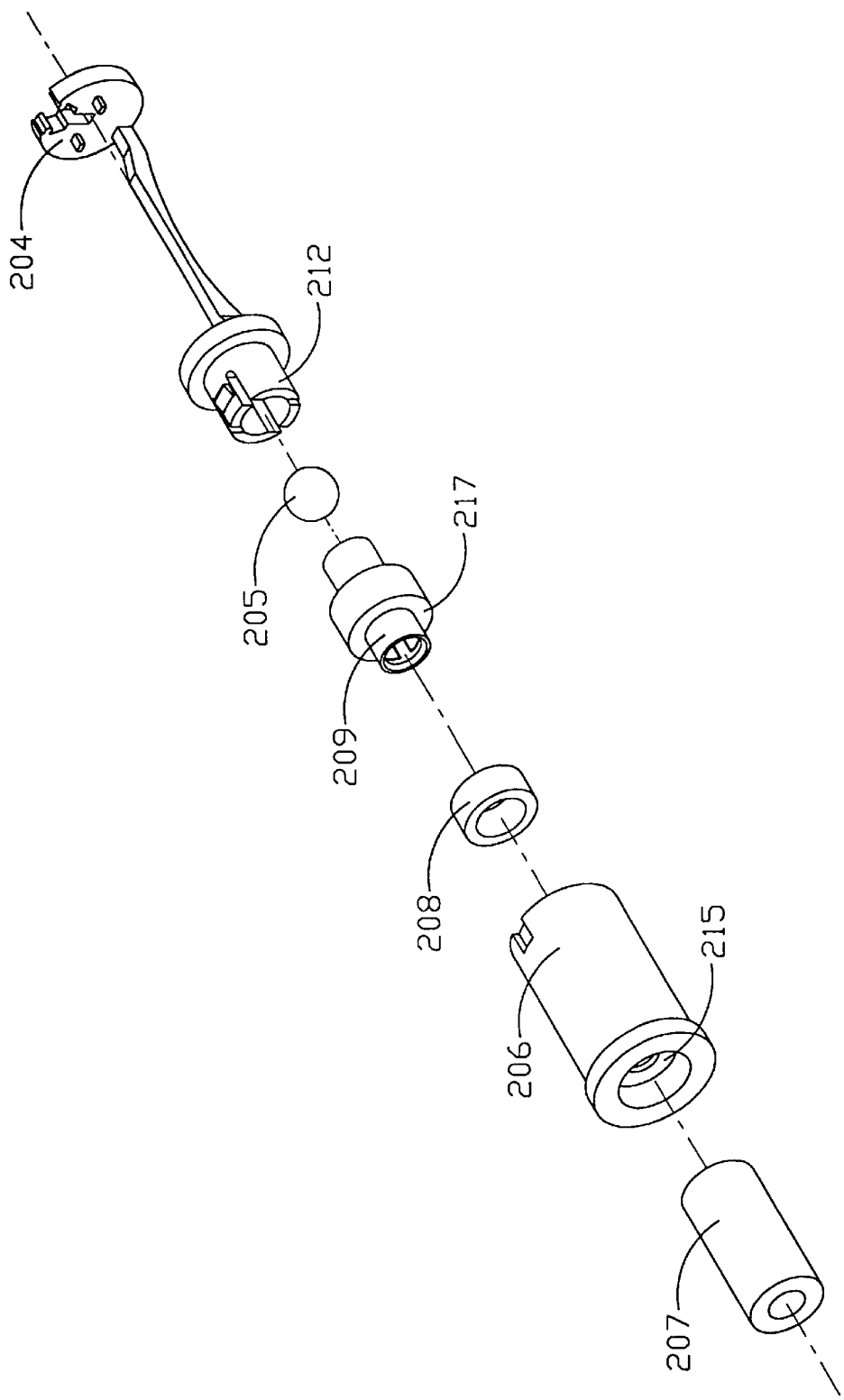
FIG. 2C shows a partial exploded view of the pressure sensitive mechanism of FIG. 2B.

Referring to FIG. 2A to FIG. 2C, one end of the supporting member 204 is provided with a first housing 212. The elastic element 205 is disposed in the first housing 212. The elastic element 205 can be ball-shaped, such as a rubber ball. The hollow cylindrical body 206 has an outer surface 213 and an inner surface 214. One end of the hollow cylindrical body 206 is leaned against the end of the supporting member 204 having the first housing 212, while the other end is provided with a pair of steps. One of the steps is engaged with the outer casing 202 such that the hollow cylindrical body 206 can be fastened by the outer casing 202. The inner surface 214 of the hollow cylindrical body 206 is formed with an annular member 215 for dividing the hollow cylindrical body 206 into the second housing and the third housing. The third housing is formed between the annular member 215 and the first housing 212. The hollow cylindrical body 206 and the annular member 215 are preferably formed integrally. The first magnetic body 207 is provided with a first central through-hole, one end thereof is engagingly received in the second housing and against the annular member 215. The first magnetic body 207 is arranged to fix in the pressure sensitive mechanism 201. The second magnetic body 208 is provided with a second central through-hole. The second magnetic body 208 is movably disposed in the third housing and one end thereof is against the annular member 215. Both of the first magnetic body 207 and the second magnetic body 208 are made of ferrite core. The dimensions of the first magnetic body 207 are preferably larger than the second magnetic body 208.

The sliding member 209 is movably disposed in the third housing. Referring to FIG. 2C, the sliding member 209 is provided with a cylindrical body and an annular element 217. The annular element 217 is formed around an outer surface of the cylindrical body to divide the sliding member 209 to a first part and a second part. The cylindrical body and the annular element 217 can be formed integrally. Preferably, an outer surface of the annular element 217 is leaned against the inner surface 214 of the hollow cylindrical body 206 such that the sliding member 209 can readily move upward and downward within the hollow cylindrical body 206. The length of the first part of the sliding member 209 is a little shorter than that of the second magnetic body 208 so that a small gap is maintained between the first part of the sliding member 209 and the annular member 215 of the hollow cylindrical body 206. The small gap is maintained for a dimension tolerance of the second magnetic body 208. That is, the small gap should be a little larger than the length of the second magnetic body 208 for the dimension tolerance. Referring to FIG. 2B, a fourth housing is formed within the first part of the sliding member 209 for engagingly receiving one end of the core body 210. The first part of the sliding member 209 engagingly passes through the second central through-hole of the second magnetic body 208 such that the sliding member 209 in conjugation with the second magnetic body 208 move upward and downward within the third housing. The second part of the sliding member 209 is leaned against the elastic element 205.

The core body 210 passes through the first central through-hole of the first magnetic body 207 and the annular member 215. One end of the first magnetic body 207 is engagingly received in the fourth housing. The coil 211 is formed of at least a wire wound around the first magnetic body 207. In the present invention, the coil 211 is preferably formed of several wires wound around the first magnetic body 207.

The print circuit board 203 is disposed on the supporting member 204. The print circuit board 203 includes an inductance-capacitance type resonant circuit being electrically connected with the coils 211.

Figure 2D:
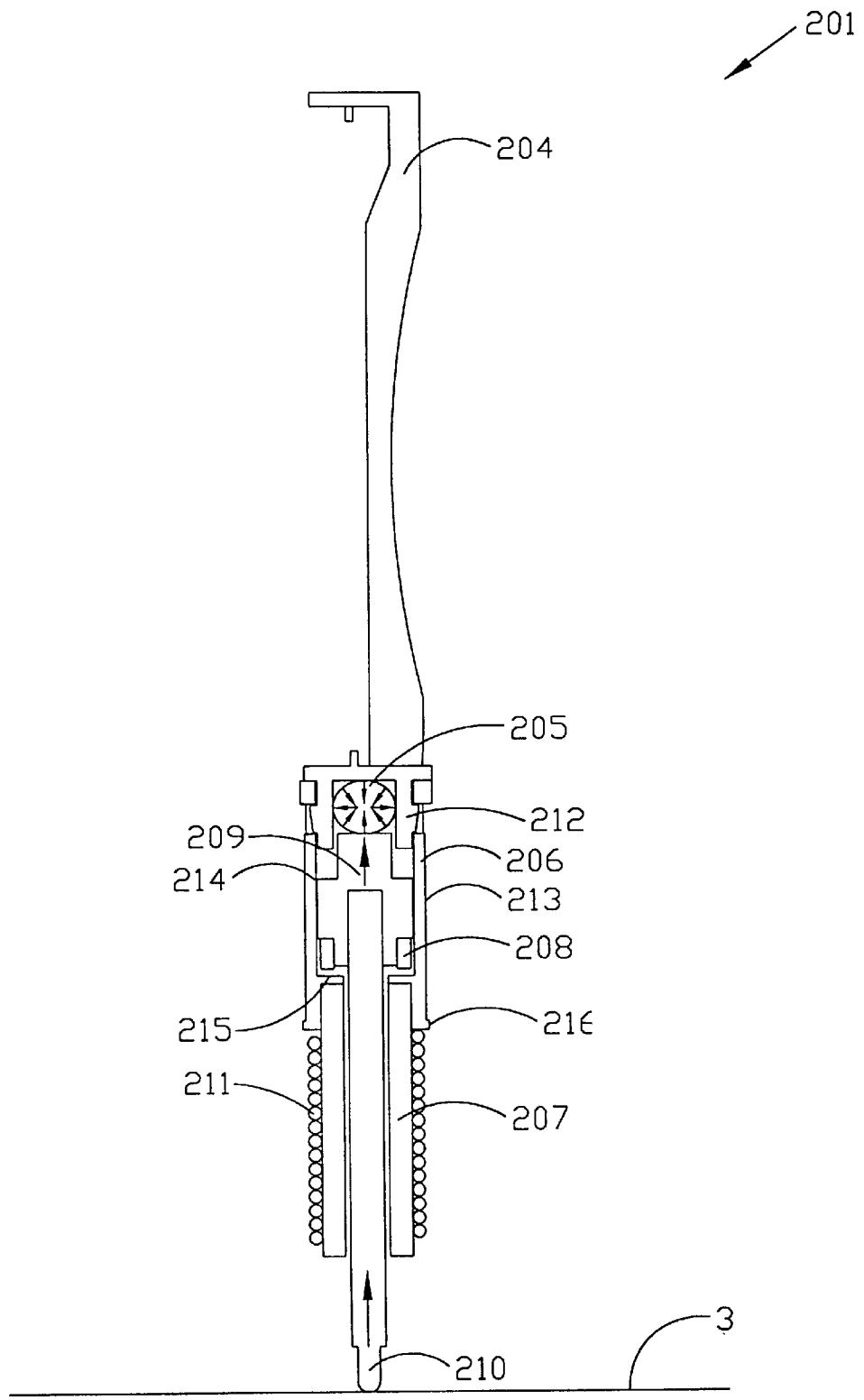
FIG. 2D shows a schematic cross-sectional view of a pressure sensitive mechanism of the pressure sensitive pen of FIG. 2A, wherein the pen is in use state.

Referring to FIG. 2D, a schematic cross-sectional view of the pressure sensitive mechanism 201 in use state is shown. The core body 210 depresses tablet 3 and simultaneously the tablet 3 applies a depressing force upward on the core body 210 such that the core body 210 in cooperation with the sliding member 209 move upward to deform the elastic element 205. The second magnetic body 208 causes the sliding member 209 to simultaneously move upward so as to change the relative distance to the first magnetic body 207, i.e. moving away from the first magnetic body 207. Thus, the inductance generated by the coil 211 is reduced. When the upward displacement of the second magnetic body 208 increases, the inductance generated by the coil 211 is reduced and the resonant frequency of the resonant circuit is increased. The resonant frequency is changed as the inductance of the coil 211 is changed when the second magnetic body 208 moves upward. The tablet 3 will receive electromagnetic field with the changing frequency emitting from the coil 211, and then generate a sensing voltage.

When there is no force applied on the core body 210, the elastic element 205 forces the sliding member 209 in conjunction with the second magnetic body 208 against the annular member 215. Besides, when the tablet 3 does not apply a depressing force on the core body 210, the predetermined distance between the first magnetic body 207 and the second magnetic body 208 is determined by the thickness of the annular member 215. Therefore, the predetermined distance between the first magnetic body 207 and the second magnetic body 208 can be accurately and properly controlled, and not varied by a common difference of the magnetic bodies in dimension. When an upward force is applied on the core body 210, the frequency output of the pressure sensitive pen 200 can be kept constant.

As to the present pressure sensitive pen 200, one coil 211 is formed of at least a wire wound around a first magnetic body 207 so that the coil 211 obtains a high Q value. Hence, the capability of the coil 211 of the pressure sensitive pen 200 for inducing/emitting electromagnetic field is very excellent. The pressure sensitive pen 200 can directly absorb electromagnetic field coming from an underlying tablet 3 to serve as power source, and therefore does not require an additional power supply such as a battery. Furthermore, the resolution of the underlying tablet 3 for detecting pressure variation of the pressure sensitive pen 200 is improved, and facilitates the signal transformation of the tablet 3 from a frequency value into a pressure value.

The preferred embodiment is only used to illustrate the present invention, and is not intended to limit the scope thereof. Many modifications of the embodiments can be made without departing from the spirit of the present invention.

What is claimed is:

1. A pressure sensitive pen having a pressure sensitive mechanism, said pressure sensitive mechanism comprising:

a supporting member with one end formed with a first housing;

an elastic element disposed in said first housing;

a hollow cylindrical body with one end being leaned against the end of said supporting member having said first housing, said hollow cylindrical body having an outer surface and an inner surface, said inner surface formed with an annular member for dividing said hollow cylindrical body into a second housing and a third housing, said third housing formed between said annular member and said first housing;

a first magnetic body having a first central through-hole, said first magnetic body with one end being engagely received in said second housing and against said annular member;

a second magnetic body having a second central through-hole, said second magnetic body being movably disposed in said third housing and one end thereof being against said annular member;

a sliding member movably disposed in said third housing, said sliding member having a cylindrical body and an annular element formed around an outer surface of said cylindrical body to divide said sliding member to a first part and a second part, and the length of said first part being a little shorter than that of said second magnetic body, said first part having a fourth housing formed therein, and said first part being engagely passing through said second central through-hole of said second magnetic body such that said sliding member moves upward and downward in conjugation with said second magnetic body, said second part of said sliding member being leaned against said elastic element;

a core body passing through said first central through-hole of said first magnetic body and said annular member and one end thereof being engagely received in said fourth housing; and one coil formed of at least a wire wound around said first magnetic body;

wherein when a force is upward applied on said core body, said sliding member in conjugation with said second magnetic body move upward away from said annular member, and when there is no force applied on said core body, said elastic element forces said sliding member in conjugation with said second magnetic body against said annular member.

2. The pressure sensitive pen of claim 1, wherein said first magnetic body is formed with a first ferrite core.

3. The pressure sensitive pen of claim 1, wherein said second magnetic body is formed with a second ferrite core.

4. The pressure sensitive pen of claim 1, wherein an outer surface of said annular element formed around said sliding member is engaged with said inner surface of said hollow cylindrical body.

5. The pressure sensitive pen of claim 1, wherein said hollow cylindrical body and said annular member are formed integrally.

6. The pressure sensitive pen of claim 1, wherein said cylindrical body and said annular element of said sliding member are formed integrally.

7. The pressure sensitive pen of claim 1, wherein said elastic element is ball-shaped.

8. The pressure sensitive pen of claim 7, wherein said elastic element is a rubber ball.

9. The pressure sensitive pen of claim 1, wherein said core body is a pen core with a steel-ball pen tip.

10. The pressure sensitive pen of claim 1, further comprising:

an outer casing for receiving said pressure sensitive mechanism; and a print circuit board disposed on said supporting member, said print circuit board having an inductance-capacitance type resonant circuit being electrically connected with said coil;

which is characterized in that when a force is upward applied on said core body, the force is further applied on said sliding member through said core body such that said sliding member in conjugation with said second magnetic body move upward to make said elastic element deformed and changing a predetermined distance between said second magnetic body and said first magnetic body, thereby changing an inductance generated by said coil and thus changing a resonance frequency of said resonant circuit.

* * * * *